United States Patent Office 3,651,034
Patented Mar. 21, 1972

3,651,034
CROSS-LINKED ETHYLENE VINYL AZETIDINONE COPOLYMERS
Eduard Kaiser, Kelkheim, Taunus, Helmut Korbanka, Gersthofen, and Hans Dieter Stemmer, Hattersheim (Main), Germany, assignors to Farbwerke Hoechst Aktiengesellschaft vormals Meister Lucius & Bruning, Frankfurt am Main, Germany
No Drawing. Filed Nov. 21, 1969, Ser. No. 878,932
Claims priority, application Germany, Dec. 13, 1968, P 18 14 447.3
Int. Cl. C08f $15/02, 15/40, 27/00$
U.S. Cl. 260—80.72        10 Claims

ABSTRACT OF THE DISCLOSURE

Cross-linked ethylene copolymers which are prepared from ethylene coplymers consisting of at least 50% by weight of ethylene and 0.5 to 40% by weight of monomers carrying azetidinone rings, which copolymers are cross-linked by heat treatment.

---

The present invention relates to cross-linked ethylene copolymers and a process for their manufacture.

Cross-linked homo- and copolymers of olefins and processes for their manufacture are known in the art. It has been proposed to use high-energy rays for the cross-linking. It is also possible to admix free radical forming compounds with the polymers, the cross-linking being achieved by the rise in temperature of the mixture. Another way to achieve the cross-linking is to heat the polymers together with substances which split off hydrogen, such as sulfur or halogen containing organic compounds. The cross linking by means of high-energy rays, however, is not very efficient because the rays do not penetrate deep enough or it is very complicated because of the necessary precautions. The frequently performed cross-linking by means of radicals which is mostly done in the presence of peroxides, requires homogeneous mixing by a separate complicated procedure. Besides that the cross-linking process is difficult to control. The same is true if in the cross-linking process use is made of substances which split off hydrogen and thus frequently lead to discoloured cross-linked products.

There is another serious drawback in the utilization of these substances in that the cross-linking agents have a corroding effect on the equipment used in the process and that they are not completely safe for men from a physiological point of view.

In accordance with French Pat. 1,490,919 terpolymers of ethylene, vinyl chloride and a small amount of a N-alkoxy-methylacrylamide can be cross-linked at elevated temperatures and thus hardened.

The N-alkoxy-methyl-acrylamide incorporated by polymerization reacts with vicinal molecules at elevated temperatures which causes the cross-linking. A drawback of this process is the fact that this principle of cross-linking is a condensation process in which volatile constituents for example alcohols, are formed which can adversely affect the quality of the cross-linking products.

It has now been found that cross-linked ethylene co-polymers in which the main chains consist exclusively of C—C-linkages and have cross-linking sites containing carbonamide groups of the structure

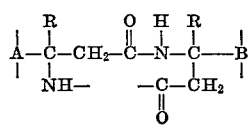

in which R stands for H or $CH_3$ and A and B are main chains, exhibit excellent properties. Further possible structures of the cross-linked polymer are as follows:

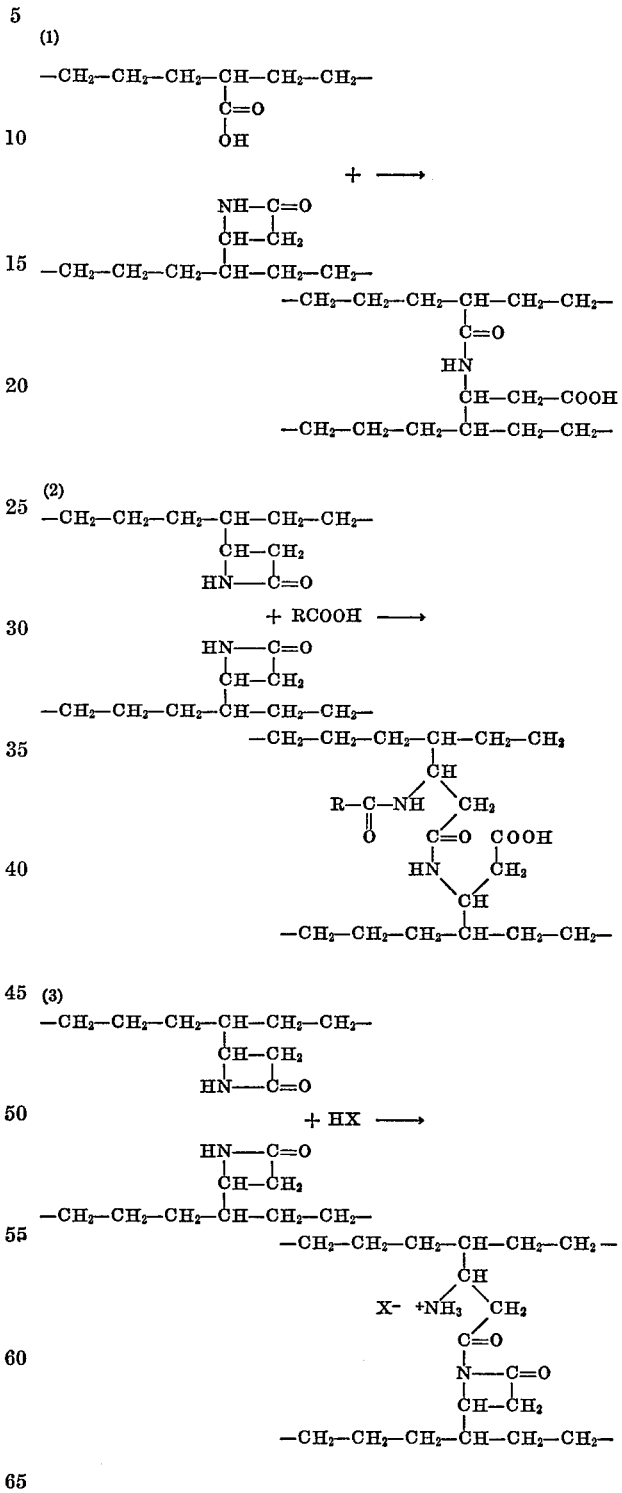

It has also been found that cross-linked ethylene copolymers can be prepared advantageously by heating to a temperature of from 100 to 300° C. copolymers which contain at least 50% by weight of ethylene structural units and 0.5 to 40% by weight, preferably 2 to 20, of azetidinone structural units of the general formula

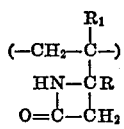

in which R and $R_1$ stand for H or $CH_3$.

The capability of being thermally cross-linked of copolymers prepared from ethylene and azetidinone-2-compounds which contain unsaturated and polymerisable groups bound in 4-position is surprising. The capability of being cross-linked of copolymers comprising azetidinone-2-rings cannot only be attributed to the azetidinone ring itself. The position in which the azetidinone ring is substituted is of special significance. Thus for instance copolymers of ethylene and azetidinone-2-compounds which contain the unsaturated polymerisable groups in 1-position, cannot be cross-linked under the conditions specified in this invention. Copolymers with 1-vinyl-4-methyl-azetidinone-2 cannot be cross-linked at 250° C. within 8 hours, even in the presence of relatively high amounts of catalysts, whereas copolymers containing 4-vinylacetidinone-2 promptly cross-link under the same conditions, even below 250° C.

The preparation of the starting copolymers which is not a subject of this invention is effected by free radical copolymerization of ethylene and the azetidinone-2-compounds mentioned above, possibly in the presence of further copolymerisable compounds, such as hydrocarbon compounds with polymerisable double bonds, vinyl halides, vinyl ethers, vinyl esters, vinyl sulfonic acids, and other vinyl-sulfonyl compounds, unsaturated nitriles, vinyl acylamides, other vinyl lactams, and acrylic acid esters. The copolymers consist of at least 50% by weight of ethylene, 0.5 to 40% by weight, preferably 2 to 20% by weight of 4-vinylazetidinone-2-compound, and possibly further copolymerisable compounds. They do not contain any cross-linked constituents and can be dissolved in the heat in organic solvents, such as aromatic hydrocarbons and chloro-hydrocarbons.

The most important starting polymers for the preparation of the cross-linked macromolecular substances of the invention are the following statistical polymers, according to the copolymerization theory (cf. L. Küchler, "Polymerisationskinetik," Springer-Verlag, Berlin 1951, pages 160 et seq.):

(1) 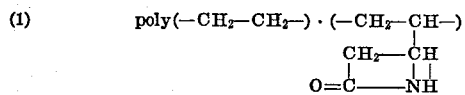

which polymer contains 0.5 to 40% by weight, preferably 2.0 to 20% by weight of 4-vinyl-azetidinone-2-structural units, has an intrinsic viscosity of $[\eta]$ of from 0.02 to 3.0 dl./g., preferably 0.1 to 1.5 dl./g. (measured in xylene at 85° C.), shows IR bands at 3290, 2930, 1760, 734, and 723 cm.$^{-1}$, $\overline{M}_w:\overline{M}_n$ as the measurement for the dispersity of the molecular weight being in the range of from 1.5 to 20, preferably between 2.0 and 10;

(2) 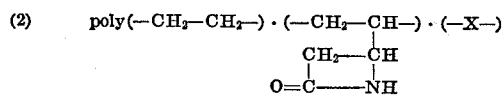

which X can be vinyl acetate, vinyl propionate, methyl or ethyl acrylate, or methyl or ethyl methacrylate, the polymer consisting of 99.5 to 50% by weight of ethylene structural units, 0.5 to 45% by weight of X-structural units, and 0.5 to 40% by weight of 4-vinyl-azetidinone structural units having the same values for intrinsic viscosity and $\overline{M}_w:\overline{M}_n$ as the polymer described under (1) above and showing another band at 1720 cm.$^{-1}$ in addition to the IR bands specified above;

(3) 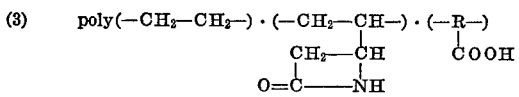

in which R—COOH can be acrylic acid, methacrylic acid, crotonic acid, or maleic acid, the polymer consisting of 99.5 to 50% by weight of ethylene structural units, 0.01 to 5.0% by weight of acid structural units, and 0.5 to 40% by weight of 4-vinylazetidinone structural units, and having the same values for intrinsic viscosity of $\overline{M}_w:\overline{M}_n$, as well as the same IR bands, as the polymer described under (2) above.

The properties of the initial polymers can be modified by changing their composition. Thus, for instance, copolymers containing more than 80% by weight of ethylene are crystalline, whereas copolymers containing 50 to 60% by weight of ethylene and, for example, 35 to 45% by weight of a vinyl ester or an acrylic acid ester are completely amorphous. These properties remain largely unchanged throughout the cross-linking reaction.

The cross-linking of the initial polymers is effected by simple heating at a temperature of from 100 to 300° C., preferably 150 to 250° C. The rate of cross-linking depends on the temperature and increases as the temperature rises. For merely thermal cross-linking processes, i.e. without the use of catalysts, temperatures in the range of from 220 to 300° C. are advantageously applied, since the rate of cross-linking is low at lower temperatures.

It was also found that the cross-linking reaction in accordance with the invention can be catalysed, which considerably increases the rate of cross-linking. Thus it becomes possible to perform the cross-linking at lower temperatures of from 150 to 250° C., which is especially important for terpolymers being sensitive to higher temperatures. The catalysed cross-linking is the mode of reaction preferred in this invention.

As catalysts for the cross-linking process all inorganic or organic compounds having an acid reaction can be used. It is suitable to choose those compounds with an acid reaction which, at the temperatures applied for the cross-linking, are neither volatile, nor affect the quality of the cross-linked products. Suitable are among other inorganic acids like phosphoric acids (for example $H_3PO_4$, $H_3PO_3$ and polyphosphoric acid) and silicic acid, salt-like compounds, such as aluminium chloride, boron trifluoride, zinc chloride, furthermore, organic acids, such as lauric acid, stearic acid, oleic acid, adipic acid, toluenesulfonic acid, ethylene-(meth-)acrylic acid copolymers and ethylene-crotonic acid copolymers etc. Carbon blacks containing acid groups and sulfur show a weaker effect as catalysts. Little satisfactory results are obtained with compounds having an alkaline reaction, such as sodium- or potassium hydroxide, calcium oxide, sodium amide, and potassium pyrrolidone. The latter components show only a minor effect as catalysts or none at all and in most cases lead to products which are irregularly cross-linked.

The catalysts for the cross-linking reaction are used in an amount of from 0.01 to 5% by weight, preferably 0.03 to 1% by weight, calculated on the copolymer. If an amount of less than 0.01% by weight of the catalyst is used, the rate of cross-linking is too low for practical purposes. With an increasing amount of the catalyst the rate of cross-linking is growing, too. For economic reasons it is not advantageous, however, to use more than 5% by weight of the catalyst. Yet if the catalyst contains only a few active groups and possibly performs still another function, for example if it serves as a filler at the same time, an amount of more than 5% by weight, up to 200% by weight of the catalyst, calculated on the initial polymer, may be added. A pertinent example is the utilization of carbon black containing acid groups as a catalyst and filler at the same time.

Favourable results can be obtained for example if the mixtures or compositions of the copolymer and the catalyst for the cross-linking have an acid number in the range of from 0.2 to 20 mg. of KOH per gram of substance. Under comparable conditions the cross-linking rate of copolymers containing 4 - vinyl - 2 - methyl-azetidinone-2 is lower than that of copolymer containing 4-vinyl-azetidinone-2. In order to arrive at higher cross-linking rates with the former copolymers it is advisable to apply higher temperatures for the cross-linking reaction and/or higher concentrations of catalysts.

The fact that above all substances having an acid reaction represent efficient catalysts for the cross-linking is surprising since alkaline compounds are exclusively being used in the art for the polymerization of the β-lactam ring to form high molecular weight polyamides of the nylon-3-type.

The catalysts for the cross-linking are either admixed with the initial copolymer before the cross-linking reaction or are already added to the initial copolymer during its preparation by being introduced into the reaction zone during the copolymerization. Preference is given to a method to chemically incorporate the cross-linking catalysts into the initial copolymer. By the introduction of ethylenically unsaturated acids, such as acrylic acid, methacrylic acid, crotonic acid, itaconic acid, sorbic acid, vinyl-sulfonic acid, maleic acid, fumaric acid, vinyl acetic acid, and similar compounds with copolymerizable double bonds into the reaction zone in which the initial copolymers are produced, copolymers having acid groups are obtained. These contain the cross-linking anchor as well as the cross-linking catalyst chemically bonded in the polymer.

The cross-linking reaction can be carried out continuously or discontinuously. The initial copolymer can be shaped discontinuously by means of heatable moulding presses to give plates or other shaped articles, at a temperature in the range of from 100 and 300° C. During this shaping process very limited cross-linking is taking place, or none at all, so that shaping is not affected. Complete cross-linking is achieved only as the moulding is continued. The residence time required depends on the temperature and is decreasing considerably with rising temperatures. It further depends on the kind and amount of the cross-linking catalyst. A sufficient cross-linking generally requires a cross-linking time of from 0.1 to 300 minutes, preferably 1 to 60 minutes, at a temperature of from 150° to 250° C.

The initial ethylene copolymers can be processed into cross-linked products by means of all common machines for the working of plastics if provisions are made for a subsequent tempering after shaping, thus for example extruders, hydraulic extruders, injection moulding machines and film-blowing machines can be used. It is possible to perform the cross-linking continuously by passing the moulded articles, such as tubes, profiles or sheets, through a heated zone in which a sufficient cross-linking degree is provided by adjusting the necessary temperature and residence time.

Besides the IR bands observed at 3290, 2930, 1760, 1470. 734, and 723 cm.$^{-1}$, the copolymers after the cross-linking show two additional bands at 1660 and 1520 cm.$^{-1}$, or, if these bands had been there before, their intensity is much increased.

The cross-linking degree of the products in accordance with the invention can vary within wide limits. For 10,000 C-atoms in the main chain there are 5 to 700, preferably 20 to 200 cross-linking sites consisting of carbonamide groups. The number of cross-linking sites can be influenced by either subjecting only a fraction of the azetidinone rings incorporated in the initial copolymer to the cross-linking reaction, or by incorporating into the initial copolymer already in the preparatory stage such a number of azetidinone rings that with a complete cross-linking reaction the desired cross-linking degree is obtained.

Products having a low cross-linking degree cannot be completely dissolved in organic solvents, but are capable of swelling to a larger extent. With a rising cross-linking degree there is a reduction in dissolution and swelling in hot organic solvents like aromatic hydrocarbons and halo-hydrocarbons. This property is the basis of a method to determine the cross-linking degree. By means of sol extraction with boiling p-xylene until weight stability is reached, all soluble non-cross-linked parts can be extracted from a sample. The amount of the insoluble cross-linked residue permits the determination of the cross-linking degree. The values obtained by this method largely correspond to values obtained by measurements of the torque in a swing elastometer. In the latter method a conical rotor moves with constant frequency and in a constant distortion angle in the reaction mixture which slowly hardens at cross-linking temperature. The dependence of the increasing power required on the time of the experiment is registered. The cross-linked ethylene copolymers of the invention exhibit improved mechanical properties. Thus the impact strength is increasing with the degree of cross-linking. In the same way the tensile strength and elongation at break are increasing; these reach a maximum in products where the cross-linking has not yet been complete. The yield stress is decreasing with an increasing cross-linking degree. Density and crystallization are changing in the same manner. Cross-linked products display a higher transparency than non-cross-linked ones.

As compared with non-cross-linked copolymers, moulded articles made from the cross-linked ethylene copolymers in accordance with the invention show an improved thermal stability under load, an improved stability towards chemicals and solvents as well as an increased resistance towards stress cracking. In comparison with cross-linked polyolefines the copolymers of the invention to metals by which property they become extremely suitable for the lining of metal tubes.

The cross-linking degree can be determined by sol extraction in the following manner: ½ to 1 gram of the sample to be tested which has to be used in the form of small particles, is put into a small wire basket of stainless steel which is inside a lifting device underneath a reflux condenser serving at the same time as closure for an Erlenmeyer flask. In the latter, 200 milliliters of p-xylene and 2 grams of an oxidation inhibitor are brought to the boil. After 12 hours of extraction weight stability is reached. The extraction residue is dried. From the loss of weight the gel portion is being determined. The gel portion is a measurement for the cross-linking degree.

Tensile strength, elongation at break and yield stress are determined according to DIN 53,455 (German Industrial Standard). The density determination is performed in accordance with DIN 53,479.

For the determination of the intrinsic viscosity [η] solutions of 2 and 0.2 grams of the substance to be tested are used in 100 milliliters of xylene. The measuring is carried out in an Ubbelohde-capillary-viscometer at 85° C.

The following examples serve to illustrate the invention, the parts and percentages being by weight unless otherwise stated.

EXAMPLES 1 TO 16

50 milliliters of the solvent indicated in Table 1 were put into a vessel provided with a stirring device and a thermometer. 10 grams of an ethylene-4-vinyl-azetidinone-2-copolymer containing 6.2% of 4-vinyl-azetidinone-2 were dissolved in this solvent under a nitrogen blanket at 100 to 150° C. The copolymer had an intrinsic viscosity [η] of 0.542 [dl./g.] (xylene; 85° C.) and a density of 0.931 gram/milliliter. It did not contain any cross-linked portion. The solution was heated to the specified temperature within 15 minutes, after the catalyst mentioned in Table 1 below had been added, if any. The time from reaching the specified temperature until the cross-linking toon place was ascertained.

TABLE 1

| Example Number | Temp. (°C.) | Cross-linking type | Catalyst Amount (mg.) | Solvent | Cross-linking time (min.) |
| --- | --- | --- | --- | --- | --- |
| 1 | 180 | None | | Deca-hydronaphthalene | 160. |
| 2 | 250 | do | | Paraffin oil | 24. |
| 3 | 170 | Sodium hydroxide | 20 | 2-ethylenehexanol | No cross-linking after 300 min. |
| 4 | 180 | Potassium pyrrolidone | 30 | Deca-hydronaphthalene | 60 (irregular). |
| 5 | 250 | Lauric acid | 10 | Paraffin oil | 7. |
| 6 | 250 | do | 1 | do | 17. |
| 7 | 250 | Stearyl alcohol | 10 | do | 19. |
| 8 | 250 | Calcium oxide | 2 | do | 24. |
| 9 | 250 | Stearic acid | 10 | do | 10. |
| 10 | 250 | Aluminium chloride (anhydrous) | 10 | do | 3. |
| 11 | 250 | Sulfur | 10 | do | 16. |
| 12 | 250 | Acid carbon black | 200 | do | 17. |
| 13 | 222 | Ethylene-crotonic-acid copolymer (25.6% of crotonic acid). | 100 | do | Instantaneously. |
| 14 | 250 | do | 10 | do | 1.5. |
| 15 | 250 | Silicic acid | 10 | do | 12. |
| 16 | 247 | Adipic acid | 10 | do | Instantaneously. |

Comparative experiment

A solution of 10 grams of a copolymer prepared from ethylene (89.3%) and 1-vinyl-4-methyl-azetidinone-2 (10.7%) having an intrinsic viscosity $[\eta]$ of 0.500 [dl./g.] (xylene; 85° C.) was dissolved in a stirring vessel in 50 milliliters of paraffin oil in a nitrogen atmosphere and was heated to 250° C. within 15 minutes after 100 milligrams of an ethylene-crotonic-acid copolymer (content of crotonic acid: 25.6%) had been added as catalyst. The solution was kept at 250° C. for 8 hours. No cross-linking was observed after that time. This example shows that no cross-linking takes place if the vinyl group is bound to the N-atom of the azetidinone ring.

EXAMPLES 17 TO 23

10 grams of a terpolymer prepared from ethylene, 4-vinylazetidinone-2, and an unsaturated acid as specified in Table 2 below were dissolved in 50 milliliters of paraffin oil at 100° C. in a nitrogen atmosphere and heated at a rate of 10° C. per minute. The temperature was not raised above 250° C. Table 2 below shows the temperature at which the cross-linking took place. For those experiments in which the cross-linking did not take place instantaneously while the temperature was raised to 250° C., the periods are indicated for how long the solution had to be kept at 250° C. until the cross-linking took place.

TABLE 2

| Example Number | Composition of the copolymer (percent) | | | Cross-linking temperature (°C.) | Time required for cross-linking (min.) |
| --- | --- | --- | --- | --- | --- |
| | 4-vinyl-azetidinone-2 | Unsaturated acid | | | |
| | | Type | Amount | | |
| 17 | 10.4 | Crotonic acid | 0.35 | 222 | Instantaneously. |
| 18 | 5.0 | Methacrylic acid | 0.35 | 208 | Do. |
| 19 | 2.4 | Crotonic acid | 0.28 | 250 | 1. |
| 20 | 5.0 | do | 0.07 | 250 | 4. |
| 21 | 5.0 | do | 0.14 | 238 | Instantaneously. |
| 22 | 5.0 | do | 0.35 | 215 | Do. |
| 23 | 1.5 | do | 0.06 | 250 | 74. |

EXAMPLE 24

10 grams of a copolymer prepared from 63.72% of ethylene, 10.3% of 4-vinyl-azetidinone-2, 0.43% of acrylic acid, and 25.55% of methyl acrylate, having an intrinsic viscosity $[\eta]$ of 0.380 [dl./g.], (xylene; 85° C.), were dissolved in 50 milliliters of paraffin oil at 100° C. The temperature was raised by 10° C. per minute. At 250° C. a spontaneous cross-linking took place.

EXAMPLE 25

The same procedure as in Example 24 above was applied to a copolymer prepared from 79.7% of ethylene, 4.44% of 4-vinylazetidinone-2, 0.26% of crotonic acid, and 15.6% of methyl methacrylate and having an intrinsic viscosity $[\eta]$ of 0.580 [dl./g.] (xylene; 85° C.). At 233° C. the cross-linking took place.

EXAMPLE 26

The same procedure as in Example 24 above was applied to a copolymer prepared from 79.7% of ethylene, 4.25% of 4-vinylazetidinone-2, 0.28% of crotonic acid, and 15.77% of vinyl acetate, having an intrinsic viscosity $[\eta]$ of 0.605 [dl./g.], (xylene; 85° C.). The cross-linking took place at 225° C.

EXAMPLE 27

From a copolymer prepared from 89.25% of ethylene, 10.4% of 4-vinyl-azetidinone-2, and 0.35% of crotonic acid (acid number 2.24 milligrams of KOH/gram), with an intrinsic viscosity $[\eta]$ of 0.465 [dl./g.] (xylene; 85° C.), sheets of a thickness of 1 millimeter were made by press-moulding for 30 minutes at 120° C., 180° C. and 240° C. The cross-linking degree as well as the mechanical properties of the sheets are shown in Table 3 below.

The same copolymer was examined at 180° C. in a swing elastometer (Messrs. Zwick & Co. KG, Einsingen, near Ulm (Danube), Germany, Model 4302). The torque increase ΔN during the cross-linking process was 0.775 mkp. The time $t_{90}$ required to reach 90% of the ΔN-value was 39 minutes.

EXAMPLE 28

From a copolymer prepared from 92.27% of ethylene, 7.30% of 4-vinyl-azetidinone-2, and 0.43% of methacrylic acid having an acid number of 2.83 milligrams of KOH/gram and an intrinsic viscosity $[\eta]$ of 0.620 [dl./g.] (xylene; 85° C.), press-moulded sheets were made at 120° C., 180° C. and 240° C., as described in Example 27 above. The cross-linking degree and the mechanical properties of the sheets are also shown in Table 3 below.

In the swing elastometer a ΔN-value of 0.767 mkp and a $t_{90}$ value of 38 minutes were determined.

TABLE 3

| Property | Press-moulding temp. (° C.) | Example No. 27 | Example No. 28 |
|---|---|---|---|
| Cross-linking degree (percent) | 120 | 0 | 29.1 |
|  | 180 | 89.3 | 89.2 |
|  | 240 | 95.8 | 94.9 |
| Density at 20° C. (g./ml.) | 120 | 0.9428 | 0.9431 |
|  | 180 | 0.9345 | 0.9332 |
|  | 240 | 0.9293 | 0.9285 |
| Tensile strength at 20° C. (kp./cm.²) | 120 | 105 | 104 |
|  | 180 | 134 | 138 |
|  | 240 | 158 | 134 |
| Tensile strength at 100° C. (kp./cm.²) | 120 | 28 | 33 |
|  | 180 | 32 | 29 |
|  | 240 | 27 | 24 |
| Elongation at break at 20° C. (percent) | 120 | 91 | 76 |
|  | 180 | 174 | 150 |
|  | 240 | 154 | 119 |
| Elongation at break at 100° C. (percent) | 120 | 235 | 455 |
|  | 180 | 149 | 128 |
|  | 240 | 101 | 92 |
| Yield stress at 20° C. (kp./cm.²) | 120 | 136 | 126 |
|  | 180 | 99 | 100 |
|  | 240 | 96 | 95 |

EXAMPLES 29 TO 33

In order to measure the time required for the cross-linking reaction and to ascertain its interdependence on the concentration of the catalyst, the torque increase in the swing elastometer at 180° C. and the cross-linking degree were determined for 5 different ethylene-4-vinyl-azetidinone-2-crotonic-acid copolymers having a different content of crotonic acid. The results are shown in Table 4 below.

TABLE 4

| Property | 29 | 30 | 31 | 32 | 33 |
|---|---|---|---|---|---|
| Intrinsic viscosity [η] (xylene; 85° C.) [dl./g.] | 0.542 | 0.365 | 0.390 | 0.465 | 0.440 |
| Density at 20° C (g./ml.) | 0.931 | 0.929 | 0.929 | 0.929 | 0.932 |
| Content of 4-vinyl-acetidinone-2 (percent) | 6.2 | 6.6 | 6.0 | 5.8 | 5.4 |
| Content of crotonic acid (percent) | 0 | 0.04 | 0.07 | 0.14 | 0.36 |
| Acid number (mg./KOH/g.) | 0 | 0.280 | 0.448 | 0.896 | 2.324 |
| Torque increase (mkp.) at 180° C. after— |  |  |  |  |  |
| 20 min | 0.010 | 0.025 | 0.060 | 0.125 | 0.390 |
| 60 min | 0.045 | 0.105 | 0.250 | 0.450 | 0.795 |
| 120 min | 0.100 | 0.230 | 0.470 | 0.710 | 0.830 |
| Cross-linking degree (percent) at 180° C. after— |  |  |  |  |  |
| 20 min | 0 | 20 | 40 | 60 | 83 |
| 60 min | 32 | 54 | 75 | 84 | 90.5 |
| 120 min | 53 | 71 | 84.5 | 89.5 | 91.5 |

EXAMPLE 34

30 grams of a terpolymer prepared from 92.6% of ethylene, 7.2% of 4-vinyl-4-methyl-azetidinone-2 and 0.2% of crotonic acid with an intrinsic viscosity [η] of 0.740 [dl./g.] (xylene; 85° C.) and an acid number of 1.344 milligrams of KOH/gram were dissolved in 30 milliliters of paraffin oil in a nitrogen atmosphere at 100° C. The temperature was raised to 280° C. When it was found that no substantial cross-linking had taken place after 30 minutes, 1 gram of an ethylene-crotonic-acid copolymer with a content of 25.6% of crotonic acid was added to the solution whereupon the cross-linking took place immediately.

We claim:

1. A cross-linked ethylene copolymer prepared, by heating to a temperature of from 100° to 300° C., a statistical ethylene copolymer containing at least 50% by weight of ethylene structural units and 0.5 to 40% by weight of azetidinone structural units of the general formula

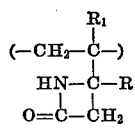

in which R and $R_1$ stand for H or $CH_3$, said cross-linked copolymer having an intrinsic viscosity [η] of from 0.02 to 3.0 dl./g. measured in xylene at 85° C.

2. A cross-linked ethylene copolymer according to claim 1, additionally containing 0.5 to 45% by weight structural units derived from other ethylenically unsaturated compounds.

3. A cross-linked ethylene copolymer according to claim 2 wherein the additional structural units are derived from an acrylic acid ester, a methacrylic acid ester, or vinyl acetate.

4. A cross-linked statistical ethylene copolymer as defined in claim 1 containing 20 to 200 carbonamide groups of the formula

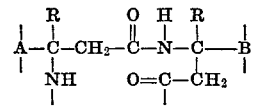

in which R stands for H or $CH_3$, and A and B for the main chains as linking members per 10,000 C-atoms.

5. A cross-linked statistical ethylene copolymer in accordance with claim 4 which additionally contains 4 to 40 carboxylic acid groups per 10,000 carbon atoms.

6. A cross-linked ethylene copolymer prepared by heating to a temperature of from 100° C. to 300° C. for up to 300 minutes, a statistical ethylene copolymer of the formula

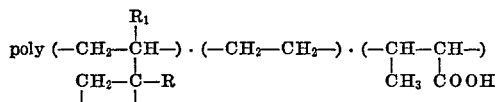

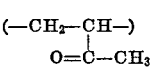

or

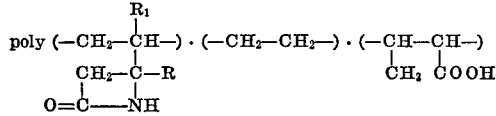

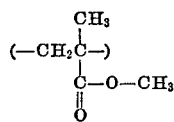

in which R and $R_1$ stand for H or $CH_3$, containing at least 50% by weight of ethylene structural units, 0.5 to 40% by weight of azetidinone structural units, 0.01 to 5.0% by weight of crotonic acid units and 0.5 to 45% by weight of vinyl acetate or methacrylic acid methyl ester units, the cross-linked copolymer having an intrinsic viscosity [η] of from 0.02 to 3.0 dl./g. measured in xylene at 85° C.

7. A process for the manufacture of a cross-linked ethylene copolymer having an intrinsic viscostiy [η] of from 0.02 to 3.0 dl./g. measured in xylene at 85° C., which comprises heating to a temperature of from 100° to 300° C., a statistical copolymer which contains at least 50% by weight of ethylene structural units and 0.5 to 40% by weight of azetidinone structural units of the general formula

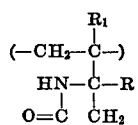

in which R and $R_1$ stand for H or $CH_3$.

8. A process in accordance with claim 7, characterized in that the heating is carried out in the presence of a substance having an acid reaction.

9. A process in accordance with claim 8, characterized in that the substance having an acid reaction is included by copolymerization in the copolymer to be cross-linked.

10. The process defined in claim 7 wherein the statistical copolymer is heated to 150° to 250° C.

References Cited

FOREIGN PATENTS 1,245,589  7/1967  Germany _____ 260—88.3

OTHER REFERENCES

CA, 69, 106353g.

JOSEPH L. SCHOFER, Primary Examiner

S. M. LEVIN, Assistant Examiner

U.S. Cl. X.R.

260—41 C, 78 SC, 78.5 R, 78.5 T, 80.73, 88.1 R, 878 R